(12) United States Patent
Medalsy (10) Patent No.: US 11,865,768 B2
(45) Date of Patent: *Jan. 9, 2024

(54) METHODS FOR PHOTO-CURING PHOTO-SENSITIVE MATERIAL FOR PRINTING AND OTHER APPLICATIONS

(71) Applicant: NEXA3D Inc., Ventura, CA (US)

(72) Inventor: Izhar Medalsy, Ventura, CA (US)

(73) Assignee: NEXA3D INC., Ventura, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/449,754

(22) Filed: Oct. 1, 2021

(65) Prior Publication Data

US 2022/0016841 A1 Jan. 20, 2022

Related U.S. Application Data (62) Division of application No. 16/105,307, filed on Aug. 20, 2018, now Pat. No. 11,203,156.

(51) Int. Cl.
  *B29C 64/129* (2017.01)
  *B33Y 30/00* (2015.01)
  (Continued)

(52) U.S. Cl.
  CPC ............ *B29C 64/129* (2017.08); *B29C 64/20* (2017.08); *B29C 64/286* (2017.08);
  (Continued)

(58) Field of Classification Search
  CPC ... B29C 64/124; B29C 64/129; B29C 64/135; B29C 64/286; B29C 64/264;
  (Continued)

(56) References Cited

U.S. PATENT DOCUMENTS 5,122,441 A 6/1992 Lawton et al.
5,182,056 A * 1/1993 Spence ................. B29C 64/135
  118/712

(Continued)

FOREIGN PATENT DOCUMENTS

CN 203864020 U 10/2014
CN 106881863 A 6/2017

(Continued)

OTHER PUBLICATIONS

International Search Report and Written Opinion dated Oct. 12, 2018, from the ISA/EPO, for International Patent Application No. PCT/US2018/041225 (filed Jul. 9, 2018), 14 pages.

(Continued)

*Primary Examiner* — Jerzi H Moreno Hernandez
(74) *Attorney, Agent, or Firm* — Ascenda Law Group, PC (57) ABSTRACT

Methods and systems for forming objects through photo-curing of a liquid resin in a tank by selective exposure (through a mask) to radiation, in which during printing operations the liquid resin in the tank is displaced relative to the build area along an axis orthogonal to that along which the object is extracted from the liquid resin in the tank. A volume of the photo-curing liquid resin may be cycled through a cooling arrangement by being extracted from the tank, cooled, and then reintroduced into the tank as printing of the object is taking place. The mask is preferably one in which charged colorant particles are dispersed in an optically transparent fluid within a plurality of bi-state cells.

20 Claims, 9 Drawing Sheets (51) Int. Cl.
*B33Y 40/00* (2020.01)
*B33Y 50/02* (2015.01)
*B29C 64/357* (2017.01)
*B29C 64/393* (2017.01)
*B29C 64/286* (2017.01)
*B33Y 10/00* (2015.01)
*B29C 64/20* (2017.01)
*B29C 64/135* (2017.01)

(52) U.S. Cl.
CPC .......... *B29C 64/357* (2017.08); *B29C 64/393* (2017.08); *B33Y 10/00* (2014.12); *B33Y 30/00* (2014.12); *B33Y 40/00* (2014.12); *B33Y 50/02* (2014.12); *B29C 64/135* (2017.08)

(58) Field of Classification Search
CPC ..... B29C 64/357; B29C 64/321; B33Y 10/00; B33Y 30/00; B33Y 40/00; B33Y 50/00
See application file for complete search history.

(56) References Cited

U.S. PATENT DOCUMENTS

| | | | |
|---|---|---|---|
| 5,248,249 A | 9/1993 | Yamamoto et al. | |
| 5,306,446 A | 4/1994 | Howe | |
| 5,340,433 A | 8/1994 | Crump | |
| 5,426,722 A | 6/1995 | Batchelder | |
| 5,491,643 A | 2/1996 | Batchelder | |
| 5,503,785 A | 4/1996 | Crump et al. | |
| 5,587,913 A | 12/1996 | Abrams et al. | |
| 5,625,495 A | 4/1997 | Moskovich | |
| 5,653,925 A | 8/1997 | Batchelder | |
| 5,764,521 A | 6/1998 | Batchelder et al. | |
| 5,900,207 A | 5/1999 | Danforth et al. | |
| 6,028,410 A | 2/2000 | Leavitt et al. | |
| 6,054,077 A | 4/2000 | Comb et al. | |
| 6,067,480 A | 5/2000 | Stuffle et al. | |
| 6,085,957 A | 7/2000 | Zinniel et al. | |
| 6,238,613 B1 | 5/2001 | Batchelder et al. | |
| 6,367,791 B1 | 4/2002 | Calderon et al. | |
| 6,437,034 B2 | 8/2002 | Lombardi et al. | |
| 6,547,995 B1 | 4/2003 | Comb | |
| 6,578,596 B1 | 6/2003 | Batchelder et al. | |
| 6,629,011 B1 | 9/2003 | Calderon et al. | |
| 6,685,866 B2 | 2/2004 | Swanson et al. | |
| 6,749,414 B1 | 6/2004 | Hanson et al. | |
| 6,790,403 B1 | 9/2004 | Priedeman, Jr. et al. | |
| D514,913 S | 2/2006 | Dunn et al. | |
| 7,063,285 B1 | 6/2006 | Turley et al. | |
| 7,255,821 B2 | 8/2007 | Priedeman, Jr. et al. | |
| 7,297,304 B2 | 11/2007 | Swanson et al. | |
| 7,534,386 B2 | 5/2009 | Priedeman, Jr. | |
| 7,896,209 B2 | 3/2011 | Batchelder et al. | |
| 7,897,074 B2 | 3/2011 | Batchelder et al. | |
| 7,910,041 B1 | 3/2011 | Priedeman, Jr. | |
| 8,014,889 B2 | 9/2011 | Zinniel et al. | |
| 8,033,811 B2 | 10/2011 | Swanson et al. | |
| D650,787 S | 12/2011 | Taatjes et al. | |
| 8,153,182 B2 | 4/2012 | Comb et al. | |
| 8,153,183 B2 | 4/2012 | Skubic et al. | |
| 8,155,775 B2 | 4/2012 | Batchelder | |
| 8,157,202 B2 | 4/2012 | Taatjes et al. | |
| D663,191 S | 7/2012 | Taatjes et al. | |
| 8,215,371 B2 | 7/2012 | Batchelder | |
| 8,221,858 B2 | 7/2012 | Mannella et al. | |
| 8,222,908 B2 | 7/2012 | Paul et al. | |
| 8,227,540 B2 | 7/2012 | Priedeman et al. | |
| 8,245,757 B2 | 8/2012 | Crump et al. | |
| 8,287,959 B2 | 10/2012 | Batchelder | |
| D673,605 S | 1/2013 | Johnson et al. | |
| 8,419,996 B2 | 4/2013 | Swanson et al. | |
| D682,490 S | 5/2013 | Goetzke et al. | |
| 8,465,111 B2 | 6/2013 | Swanson et al. | |
| 8,598,509 B2 | 12/2013 | Batchelder | |
| 8,609,204 B2 | 12/2013 | Kritchman | |
| 8,636,850 B2 | 1/2014 | Narovlyansky et al. | |
| 8,663,533 B2 | 3/2014 | Swanson et al. | |
| 8,663,568 B2 | 3/2014 | Bar Nathan et al. | |
| 8,815,141 B2 | 8/2014 | Swanson et al. | |
| 8,955,558 B2 | 2/2015 | Bosveld et al. | |
| 8,961,167 B2 | 2/2015 | Swanson et al. | |
| 8,974,715 B2 | 3/2015 | Hopkins et al. | |
| 8,986,767 B2 | 3/2015 | Batchelder | |
| 9,027,378 B2 | 5/2015 | Crump et al. | |
| 9,050,753 B2 | 6/2015 | Rodgers et al. | |
| 9,050,788 B2 | 6/2015 | Swanson et al. | |
| D734,788 S | 7/2015 | Reches et al. | |
| 9,073,263 B2 | 7/2015 | Mannella et al. | |
| 9,090,428 B2 | 7/2015 | Batchelder et al. | |
| 9,108,360 B2 | 8/2015 | Comb et al. | |
| 9,141,015 B2 | 9/2015 | Hanson et al. | |
| D741,149 S | 10/2015 | Koop et al. | |
| 9,174,388 B2 | 11/2015 | Batchelder et al. | |
| 9,174,389 B2 | 11/2015 | Swanson | |
| 9,205,601 B2 | 12/2015 | Desimone et al. | |
| 9,205,690 B2 | 12/2015 | Leavitt et al. | |
| 9,215,882 B2 | 12/2015 | Zimmerman et al. | |
| 9,233,506 B2 | 1/2016 | Leavitt | |
| 9,238,329 B2 | 1/2016 | Swanson et al. | |
| 9,321,609 B2 | 4/2016 | Koop et al. | |
| 9,334,402 B2 | 5/2016 | Napadensky | |
| 9,359,499 B2 | 6/2016 | Cernohous | |
| 9,399,320 B2 | 7/2016 | Johnson et al. | |
| 9,423,756 B2 | 8/2016 | Hanson et al. | |
| 9,427,838 B2 | 8/2016 | Comb et al. | |
| 9,483,588 B2 | 11/2016 | Nehme et al. | |
| 9,511,547 B2 | 12/2016 | Swanson et al. | |
| 9,523,934 B2 | 12/2016 | Orrock et al. | |
| 9,527,247 B2 | 12/2016 | Dikovsky et al. | |
| D777,251 S | 1/2017 | Reches et al. | |
| 9,546,270 B2 | 1/2017 | Hirsch et al. | |
| 9,550,327 B2 | 1/2017 | Swanson et al. | |
| 10,328,634 B2 | 6/2019 | Zitelli et al. | |
| 11,203,156 B2 * | 12/2021 | Medalsy | B29C 64/135 |
| 2009/0179355 A1 * | 7/2009 | Wicker | B29C 64/135 264/401 |
| 2010/0140849 A1 | 6/2010 | Comb et al. | |
| 2010/0161105 A1 | 6/2010 | Blake | |
| 2011/0117268 A1 | 5/2011 | Batchelder et al. | |
| 2012/0258190 A1 | 10/2012 | Batchelder et al. | |
| 2013/0186549 A1 | 7/2013 | Comb et al. | |
| 2013/0186558 A1 | 7/2013 | Comb et al. | |
| 2013/0224423 A1 | 8/2013 | Mikulak et al. | |
| 2013/0297063 A1 | 11/2013 | Kritchman et al. | |
| 2014/0036455 A1 | 2/2014 | Napadensky | |
| 2014/0052288 A1 | 2/2014 | El-Siblani et al. | |
| 2014/0127524 A1 | 5/2014 | Batchelder et al. | |
| 2014/0141166 A1 | 5/2014 | Rodgers | |
| 2014/0265032 A1 | 9/2014 | Teicher et al. | |
| 2014/0319716 A1 | 10/2014 | Shtilerman | |
| 2014/0339720 A1 | 11/2014 | Menchik et al. | |
| 2014/0358273 A1 | 12/2014 | LaBossiere et al. | |
| 2015/0001750 A1 | 1/2015 | Kozlak et al. | |
| 2015/0024317 A1 | 1/2015 | Orrock et al. | |
| 2015/0028523 A1 | 1/2015 | Jaker et al. | |
| 2015/0037587 A1 | 2/2015 | Sella | |
| 2015/0072293 A1 * | 3/2015 | DeSimone | B29C 64/129 355/18 |
| 2015/0076739 A1 | 3/2015 | Batchelder | |
| 2015/0084239 A1 | 3/2015 | Batchelder et al. | |
| 2015/0097053 A1 | 4/2015 | Batchelder et al. | |
| 2015/0097307 A1 | 4/2015 | Batchelder et al. | |
| 2015/0097308 A1 | 4/2015 | Batchelder et al. | |
| 2015/0097316 A1 * | 4/2015 | DeSimone | A61F 2/82 264/401 |
| 2015/0145171 A1 | 5/2015 | Walker et al. | |
| 2015/0145174 A1 | 5/2015 | Comb | |
| 2015/0148931 A1 | 5/2015 | Heide | |
| 2015/0152217 A1 | 6/2015 | Cernohous et al. | |
| 2015/0158691 A1 | 6/2015 | Mannella et al. | |
| 2015/0209836 A1 | 7/2015 | Dunn et al. | |
| 2015/0210010 A1 | 7/2015 | Napadensky | |
| 2015/0224709 A1 | 8/2015 | Napadensky | |
| 2015/0224710 A1 | 8/2015 | El-Siblani | |

(56) References Cited

U.S. PATENT DOCUMENTS

| | | |
|---|---|---|
| 2015/0224714 A1 | 8/2015 | Swanson et al. |
| 2015/0224717 A1 | 8/2015 | Kritchman |
| 2015/0251353 A1 | 9/2015 | Rodgers et al. |
| 2015/0251356 A1 | 9/2015 | Batchelder |
| 2015/0252190 A1 | 9/2015 | Rodgers et al. |
| 2015/0259530 A1 | 9/2015 | Rodgers et al. |
| 2015/0266236 A1 | 9/2015 | Farah et al. |
| 2015/0266241 A1 | 9/2015 | Batchelder |
| 2015/0266242 A1 | 9/2015 | Comb et al. |
| 2015/0273582 A1 | 10/2015 | Crump et al. |
| 2015/0273767 A1 | 10/2015 | Batchelder et al. |
| 2015/0352788 A1 | 12/2015 | Livingston et al. |
| 2015/0360417 A1 | 12/2015 | Kritchman et al. |
| 2016/0009027 A1 | 1/2016 | Martin |
| 2016/0023373 A1 | 1/2016 | Demuth et al. |
| 2016/0033756 A1 | 2/2016 | Miller |
| 2016/0039120 A1 | 2/2016 | Dikovsky et al. |
| 2016/0039146 A1 | 2/2016 | Swanson et al. |
| 2016/0039147 A1 | 2/2016 | Crump et al. |
| 2016/0046072 A1 | 2/2016 | Rolland et al. |
| 2016/0046075 A1 | 2/2016 | DeSimone et al. |
| 2016/0046080 A1 | 2/2016 | Thomas et al. |
| 2016/0052205 A1 | 2/2016 | FrantzDale |
| 2016/0082655 A1 | 3/2016 | Castanon et al. |
| 2016/0107383 A1 | 4/2016 | Dikovsky et al. |
| 2016/0114535 A1 | 4/2016 | Kritchman et al. |
| 2016/0122541 A1 | 5/2016 | Jaker et al. |
| 2016/0129645 A1 | 5/2016 | Wighton et al. |
| 2016/0136890 A1 | 5/2016 | Castanon et al. |
| 2016/0161872 A1 | 6/2016 | Orrock et al. |
| 2016/0167313 A1 | 6/2016 | Swanson et al. |
| 2016/0176120 A1 | 6/2016 | Skubic et al. |
| 2016/0193786 A1 | 7/2016 | Moore et al. |
| 2016/0193791 A1 | 7/2016 | Swanson et al. |
| 2016/0200052 A1 | 7/2016 | Moore et al. |
| 2016/0229123 A1 | 8/2016 | Carlson et al. |
| 2016/0236421 A1 | 8/2016 | Mannella et al. |
| 2016/0236899 A1 | 8/2016 | Beery et al. |
| 2016/0250810 A1 | 9/2016 | Lynch August et al. |
| 2016/0251486 A1 | 9/2016 | Cernohous et al. |
| 2016/0257033 A1 | 9/2016 | Jayanti et al. |
| 2016/0263830 A1 | 9/2016 | Batchelder et al. |
| 2016/0263837 A1 | 9/2016 | Goldman et al. |
| 2016/0303793 A1 | 10/2016 | Ermoshkin et al. |
| 2016/0303795 A1 | 10/2016 | Liu et al. |
| 2016/0311158 A1 | 10/2016 | DeSimone et al. |
| 2016/0325493 A1 | 11/2016 | DeSimone et al. |
| 2016/0339643 A1 | 11/2016 | Dikovsky et al. |
| 2016/0339646 A1 | 11/2016 | Baecker et al. |
| 2016/0342149 A1 | 11/2016 | Napadensky |
| 2016/0361763 A1 | 12/2016 | Batchelder et al. |
| 2016/0369096 A1 | 12/2016 | Rolland et al. |
| 2016/0375636 A1 | 12/2016 | Rodgers et al. |
| 2016/0378004 A1 | 12/2016 | Martin |
| 2017/0050389 A1* | 2/2017 | Lee .................. B33Y 40/00 |
| 2017/0072627 A1* | 3/2017 | Li .................... B29C 64/129 |
| 2017/0129167 A1* | 5/2017 | Castanon ............ B29C 64/124 |
| 2017/0151717 A1 | 6/2017 | Li |
| 2017/0277024 A1* | 9/2017 | Li .................... B29C 64/129 |
| 2018/0029290 A1 | 2/2018 | Bottiglio et al. |
| 2018/0029296 A1* | 2/2018 | Van Esbroeck ....... B29C 64/129 |
| 2018/0029311 A1 | 2/2018 | Depalma et al. |
| 2018/0036941 A1 | 2/2018 | Xu et al. |
| 2018/0126647 A1* | 5/2018 | Schultheiss ......... B29C 64/129 |
| 2018/0136514 A1 | 5/2018 | van Esbroeck et al. |
| 2018/0200948 A1 | 7/2018 | Kuijpers et al. |
| 2018/0333917 A1* | 11/2018 | Lee .................. B29C 64/129 |
| 2018/0341184 A1 | 11/2018 | Hundley et al. |
| 2019/0116938 A1 | 4/2019 | DeHaven et al. |
| 2019/0212572 A1 | 7/2019 | Tomioka |
| 2020/0001525 A1* | 1/2020 | Wynne ............... B29C 64/129 |
| 2020/0180215 A1 | 6/2020 | Truong |
| 2020/0307089 A1* | 10/2020 | Costabeber ......... B29C 64/124 |

FOREIGN PATENT DOCUMENTS

| | | |
|---|---|---|
| CN | 107336438 A | 11/2017 |
| CN | 107428084 A | 12/2017 |
| CN | 206840705 U | 1/2018 |
| CN | 108773067 A | 11/2018 |
| JP | H04-135827 A | 5/1992 |
| JP | 2948893 B2 | 9/1999 |
| JP | 2005-131938 A | 5/2005 |
| JP | 2014-518171 A | 7/2014 |
| JP | 2018-515379 A | 6/2018 |
| WO | WO9937453 A1 | 7/1999 |
| WO | WO9937454 A1 | 7/1999 |
| WO | WO9937456 A1 | 7/1999 |
| WO | WO9937457 A1 | 7/1999 |
| WO | WO9960508 A1 | 11/1999 |
| WO | WO2007005236 A1 | 11/2007 |
| WO | WO2009088420 A1 | 7/2009 |
| WO | WO2009088423 A1 | 7/2009 |
| WO | WO2012140658 A2 | 10/2012 |
| WO | WO2012140658 A3 | 10/2012 |
| WO | WO2014149312 A1 | 9/2014 |
| WO | WO2014186463 A1 | 11/2014 |
| WO | WO2015084422 A1 | 6/2015 |
| WO | WO2015145439 A1 | 10/2015 |
| WO | WO 2015164234 A1 | 10/2015 |
| WO | WO2015170330 A1 | 11/2015 |
| WO | WO2015175682 A1 | 11/2015 |
| WO | WO2016009426 A1 | 1/2016 |
| WO | WO2016010946 A1 | 1/2016 |
| WO | WO2016014088 A1 | 1/2016 |
| WO | WO2016014543 A1 | 1/2016 |
| WO | WO2016049642 A1 | 3/2016 |
| WO | WO2016063282 A1 | 4/2016 |
| WO | WO2016081410 A1 | 5/2016 |
| WO | WO2016085965 A1 | 6/2016 |
| WO | WO2016106136 A2 | 6/2016 |
| WO | WO2016106136 A3 | 6/2016 |
| WO | WO2016109550 A1 | 7/2016 |
| WO | 2016/122408 A1 | 8/2016 |
| WO | WO2016123499 A1 | 8/2016 |
| WO | WO2016123506 A1 | 8/2016 |
| WO | WO2016125170 A1 | 8/2016 |
| WO | WO2016126796 A2 | 8/2016 |
| WO | WO2016126796 A3 | 8/2016 |
| WO | WO2016133759 A1 | 8/2016 |
| WO | WO2016138345 A1 | 9/2016 |
| WO | WO2016140886 A1 | 9/2016 |
| WO | WO2016140891 A1 | 9/2016 |
| WO | WO2016142947 A2 | 9/2016 |
| WO | WO2016142947 A3 | 9/2016 |
| WO | WO2016145050 A1 | 9/2016 |
| WO | WO2016145182 A1 | 9/2016 |
| WO | WO2016149097 A1 | 9/2016 |
| WO | WO2016149104 A1 | 9/2016 |
| WO | WO2016149151 A1 | 9/2016 |
| WO | WO2016151586 A1 | 9/2016 |
| WO | WO2016172784 A1 | 11/2016 |
| WO | WO2016172788 A1 | 11/2016 |
| WO | WO2016172804 A1 | 11/2016 |
| WO | WO2016172805 A1 | 11/2016 |
| WO | WO2016191473 A1 | 12/2016 |
| WO | WO2016199131 A1 | 12/2016 |
| WO | WO2016205690 A1 | 12/2016 |
| WO | WO2017009830 A1 | 1/2017 |
| WO | WO2017009831 A1 | 1/2017 |
| WO | WO2017009832 A1 | 1/2017 |
| WO | WO2017009833 A1 | 1/2017 |
| WO | WO2017056124 A1 | 4/2017 |
| WO | 2017/165832 A1 | 9/2017 |
| WO | WO2017210298 A1 | 12/2017 |
| WO | WO2017219942 A1 | 12/2017 |
| WO | 2018006018 A1 | 1/2018 |
| WO | WO2018006029 A1 | 1/2018 |

(56) References Cited

FOREIGN PATENT DOCUMENTS

WO   WO2018032531 A1   2/2018
WO   WO2019014098 A1   1/2019

OTHER PUBLICATIONS

International Application No. PCT/US2019/045214; International Search Report and Written Opinion; ISA/EP; dated Nov. 26, 2019; 16 pages.
International Search Report and Written Opinion dated Jun. 24, 2020, from the ISA/European Patent Office, for International Application No. PCT/US2019/060219 (filed Nov. 7, 2019), 22 pgs.
International Search Report and Written Opinion dated Jul. 7, 2020, from ISA/European Patent Office, for International Patent Application No. PCT/US2020/026342 (filed Apr. 2, 2020), 49 pages.
International Preliminary Report on Patentability dated Feb. 17, 2021, for International Patent Application No. PCT/US2020/026342 (filed Apr. 2, 2020), 10 pgs.
International Search Report dated May 7, 2020, from the ISA/European Patent Office, for International Application No. PCT/US2020/013895 (filed Jan. 16, 2020), 3 pgs.
Written Opinion dated May 7, 2020, from the ISA/European Patent Office, for International Application No. PCT/US2020/013895 (filed Jan. 16, 2020), 6 pgs.
Non-Final Office Action dated Jan. 7, 2021, from U.S. Appl. No. 16/105,307 (filed Aug. 20, 2018), 14 pgs.
Amendment filed Jan. 25, 2021, from U.S. Appl. No. 16/105,307 (filed Aug. 20, 2018), 12 pgs.
Non-Final Office Action dated Jan. 21, 2021, from U.S. Appl. No. 16/373,449 (filed Apr. 2, 2019), 11 pgs.
Amendment filed Feb. 5, 2021, from U.S. Appl. No. 16/373,449 (filed Apr. 2, 2019), 8 pgs.
Notice of Allowance dated Feb. 17, 2021, from U.S. Appl. No. 16/373,449 (filed Apr. 2, 2019), 8 pgs.
Written Opinion of the International Preliminary Examining Authority dated Feb. 16, 2021, from the IPEA/European Patent Office, for International Patent Application No. PCT/US2020/013895 (filed Jan. 16, 2020), 6 pgs.
International Preliminary Report on Patentability dated Apr. 1, 2021, from the IPEA/US, for International Patent Application No. PCT/US2019/045214 (filed Aug. 6, 2019), 13 pgs.
International Preliminary Report on Patentability dated May 20, 2021, from The International Bureau of WIPO, for International Patent Application No. PCT/US2019/060219 (filed Nov. 7, 2019), 14 pgs.
International Preliminary Report on Patentability dated Jun. 14, 2021, from the IPEA/European Patent Office, for International Patent Application No. PCT/US2020/013895 (filed Jan. 16, 2020), 14 pgs.
Examination Report dated Feb. 23, 2022, from the Intellectual Property India, The Patent Office, for India Patent Application No. 202117034931 (filed Aug. 3, 2021), 5 pgs.
Examination Report dated Apr. 22, 2022, from the Intellectual Property India, The Patent Office, for India Patent Application No. 202117038096 (filed Aug. 23, 2021), 6 pgs.
Notice of Allowance dated Aug. 31, 2021, for U.S. Appl. No. 16/745,158 (filed Jan. 16, 2020), 10 pgs.
Amendment filed Aug. 12, 2021, for U.S. Appl. No. 16/745,158 (filed Jan. 16, 2020), 7 pgs.
Final Office Action dated Jul. 19, 2021, for U.S. Appl. No. 16/745,158 (filed Jan. 16, 2020), 12 pgs.
Amendment filed Jul. 7, 2021, for U.S. Appl. No. 16/745,158 (filed Jan. 16, 2020), 8 pgs.
Non-Final Office Action dated Jun. 24, 2021, for U.S. Appl. No. 16/745,158 (filed Jan. 16, 2020), 12 pgs.
Notice of Allowance dated Sep. 16, 2021, for U.S. Appl. No. 16/676,940 (filed Nov. 7, 2019), 9 pgs.
Amendment filed Sep. 2, 2021, for U.S. Appl. No. 16/676,940 (filed Nov. 7, 2019), 7 pgs.
Final Office Action dated Sep. 2, 2021, for U.S. Appl. No. 16/676,940 (filed Nov. 7, 2019), 12 pgs.
Amendment filed Aug. 18, 2021, for U.S. Appl. No. 16/676,940 (filed Nov. 7, 2019), 10 pgs.
Non-Final Office Action dated Jun. 9, 2021, for U.S. Appl. No. 16/676,940 (filed Nov. 7, 2019), 19 pgs.
Notice of Allowance dated Aug. 4, 2021, for U.S. Appl. No. 16/105,307 (filed Aug. 20, 2018), 10 pgs.
Advisory Action dated Jun. 18, 2021, for U.S. Appl. No. 16/105,307 (filed Aug. 20, 2018), 6 pgs.
Amendment filed Jun. 18, 2021, for U.S. Appl. No. 16/105,307 (filed Aug. 20, 2018), 9 pgs.
Amendment filed May 14, 2021, for U.S. Appl. No. 16/105,307 (filed Aug. 20, 2018), 8 pgs.
Final Office Action dated Apr. 28, 2021, for U.S. Appl. No. 16/105,307 (filed Aug. 20, 2018), 19 pgs.
First Office Action dated Jun. 29, 2022, from the State Intellectual Property Office of the P.R.C., for Chinese Patent Application No. 201980069128.4 (filed Apr. 20, 2021), 9 pgs.
Office Action dated Mar. 1, 2023, from the Japanese Patent Office (JPO), for Japanese Patent Application No. 2021-510027, 5 pgs.

* cited by examiner

METHODS FOR PHOTO-CURING PHOTO-SENSITIVE MATERIAL FOR PRINTING AND OTHER APPLICATIONS

RELATED APPLICATIONS

This application is a Divisional Application of U.S. application Ser. No. 16/105,307, filed on 20 Aug. 2018 (now issued as U.S. Pat. No. 11,203,156), which is incorporated by reference herein.

FIELD OF THE INVENTION

The present invention relates generally to photolithographic systems as employ a photo-sensitive resin which is cured through selective exposure to radiation and, more specifically, to systems and methods of additive manufacturing in which such a photo-sensitive resin is cured through exposure to radiation when fabricating a three-dimensional object.

BACKGROUND

A variety of systems rely on the selective curing of photo-sensitive resins. For example, photolithographic systems employ such techniques for printing two-dimensional patterns on substrates. Additionally, so-called three-dimensional ("3D") printers create multi-layer structures by photo-curing a viscous, liquid resin (typically a liquid polymer) layer-by-layer to form a desired object. In this latter case, data representing the three-dimensional object to be formed is organized as a series of two-dimensional layers which represent transverse sections of the object and the build proceeds (either top down or bottom up) according to that design.

The polymerization process by which the liquid resin solidifies into the desired object layers is exothermic. At least in the case of 3D printers, and perhaps because of the highly viscous nature of the resin, the heat generated by this process tends to remain localized within the area in which printing occurs—the so-called build area. This can be quite detrimental, especially in continuous or near-continuous printing operations, as excessive heat in the build area will affect the quality of the layers being printed, e.g., by contributing to undesired curing of the resin.

SUMMARY OF THE INVENTION

In various embodiments, the present invention provides methods and systems for forming objects through photo-curing of a liquid resin in a tank by selective exposure to radiation, in which, during printing operations, the liquid resin in the tank is recirculated, e.g., through a reservoir. As a result, the photo-curing liquid resin within the print or build area is continually, or mostly so, varied, and, consequently, the temperature of the liquid resin within the build area is managed so as not to become so high as to affect the quality of the curing layers of the object being fashioned. Further, in various embodiments of the invention, a volume of the photo-curing liquid resin is cycled through a cooling arrangement by being extracted from the tank, cooled, and then reintroduced into the tank as printing of the object is taking place. Recycling of the photo-curing liquid resin in this fashion further helps to manage the temperature of the liquid resin in the tank.

In one embodiment, an apparatus configured in accordance with the present invention includes a tank configured to contain a photo-curing liquid polymer. The tank has sidewalls, one or more of which include sidewall openings, and a bottom with a bottom opening therein. A flexible membrane is disposed on the bottom of the tank and covers the bottom opening. A light source is configured to emit collimated (e.g., by means of a telecentric lens system), ultraviolet light towards the bottom opening of the tank and through a mask (e.g., one in which charged colorant particles are dispersed in an optically transparent fluid within a plurality of bi-state cells) disposed between the light source and the flexible membrane. In some embodiments, a glass member may be placed between the membrane and the mask. The collimated ultraviolet light emitted by the light source is filtered by the mask prior to passing through the flexible membrane into the tank.

An extraction plate is disposed within the tank and an object formed from cured portions of the photo-curing liquid polymer may be affixed to the extraction plate, the vertical displacement (from the bottom of the tank) of which is controlled by a height adjustor. A controller is configured to operate the height adjustor so as to adjust the vertical displacement of the extraction plate during printing of the object. Further, a resin circulatory system is configured, under control of the controller, to pump a first volume of the photo-curing liquid resin out of the tank via one of the sidewall openings and into a reservoir and to pump a second (optionally, equal) volume of the photo-curing liquid resin into the tank from the reservoir during printing, e.g., via a second sidewall opening.

Preferably, the first and second sidewall openings are on opposite lateral sides of the tank. These opposite lateral sides of the tank define a shortest lateral dimension of the tank. Thus, the resin circulatory system is configured to circulate the photo-curing liquid resin through the tank along an axis orthogonal to an axis along which the height adjustor translates the extraction plate. The resin circulatory system may include a heat exchanger and one or more peristaltic pumps operable under control of the controller. An additional cooling arrangement may be present to cool an underside of the mask, for example by blowing chilled air thereon.

Additionally, one or more thermal imaging devices may be used to provide feedback to the controller during printing operations.

In a further embodiment, an additive manufacturing apparatus in which an object is formed through photo-curing of a liquid resin contained in a tank through selective exposure to radiation includes an extraction plate, a radiation source, and a tank having a radiation-transparent flexible membrane as at least a portion of a bottom thereof. The radiation-transparent flexible membrane is positioned between the extraction plate and the radiation source, and the extraction plate is configured to be displaceable along a first axis defined by a relative position of the extraction plate and the radiation source. The tank includes ports through which photo-curing liquid resin is recirculated through the tank along a second axis orthogonal to the first axis. The additive manufacturing apparatus may therefore include a pumping arrangement between the ports by which a volume of the photo-curing liquid resin is recycled through the tank after passing through a cooling arrangement.

Such a cooling arrangement may include a length of tubing for transporting the volume of the photo-curing liquid resin, that length of tubing being in contact with a heat sink. Alternatively, or in addition, the cooling arrangement may include a Peltier element. The pumping arrangement may include a peristaltic pump in contact with the length of tubing and a reservoir for the photo-curing liquid resin.

In embodiments of the present invention, a light source and a mask are controlled so as to form (e.g., by curing) a first layer of photo-cured liquid resin of an object located within a tank containing a photo-curing liquid resin. The tank includes a tank opening that is sealed by a radiation-transparent flexible member. A height adjustor is controlled so as to displace the object along a first axis with respect to a first surface of the radiation-transparent flexible membrane facing into the tank. The light source and the mask are further controlled so as to form successive layers of photo-cured liquid resin of the object, during which time a pumping arrangement is controlled to circulate a volume of the photo-curing liquid resin through the tank while forming the layers, such that the photo-curing liquid resin is introduced into and extracted from the tank along an axis orthogonal to the first axis.

The mask is controlled to display a desired pattern (e.g., that of a layer of the object being fabricated) by arranging said bi-state cells of the mask into ones with a clear state and others with a dark state. The respective states of the cells are realized, in one embodiment, by compacting colorant particles of the clear state cells within recesses provided in the clear state cells, and not compacting colorant particles of the dark state cells. The respective states of the cells are controlled through the application of bias voltages to electrodes of the cells according to the desired pattern.

These and further embodiments of the invention are described below.

DETAILED DESCRIPTION

In the following description of embodiments of the invention, reference is made to the accompanying drawings that form a part hereof, and in which are shown by way of illustration specific embodiments in and by which the invention may be practiced. It should be understood that other embodiments may be realized based on the teachings presented herein without departing from the scope of the present invention. Description associated with any one of the figures may be applied to a different figure containing like or similar components/steps.

As noted above, the exothermic nature of the polymerization process in 3D printers that fabricate objects through curing of a photo-sensitive resin can lead to undesirable, yet localized, areas of elevated temperatures within the vat of resin from which the object is fabricated. In various embodiments, the present invention provides methods and systems for reducing or eliminating side effects of such localized heating by displacing the resin relative to build area for the object. In practice, this is achieved by circulating a volume of the resin through the build area along an axis orthogonal to that along which the object is extracted from the resin. This is done, in one embodiment, by extracting a first volume of resin from the tank and introducing a second volume (which may be equal to or different than the first volume) into the tank during the printing process. By circulating the resin in this fashion, and optionally through a reservoir, the photo-curing liquid resin within the build area is continually, or mostly so, refreshed. As a result, the temperature of the liquid resin within the build area is maintained at a level that does not negatively affect the quality of the curing layers of the object being fashioned. In addition, in various embodiments of the invention, the photo-curing liquid resin is cycled through a cooling arrangement before being reintroduced into the tank. This further helps to manage the temperature of the liquid resin in the tank.

Figure 1:
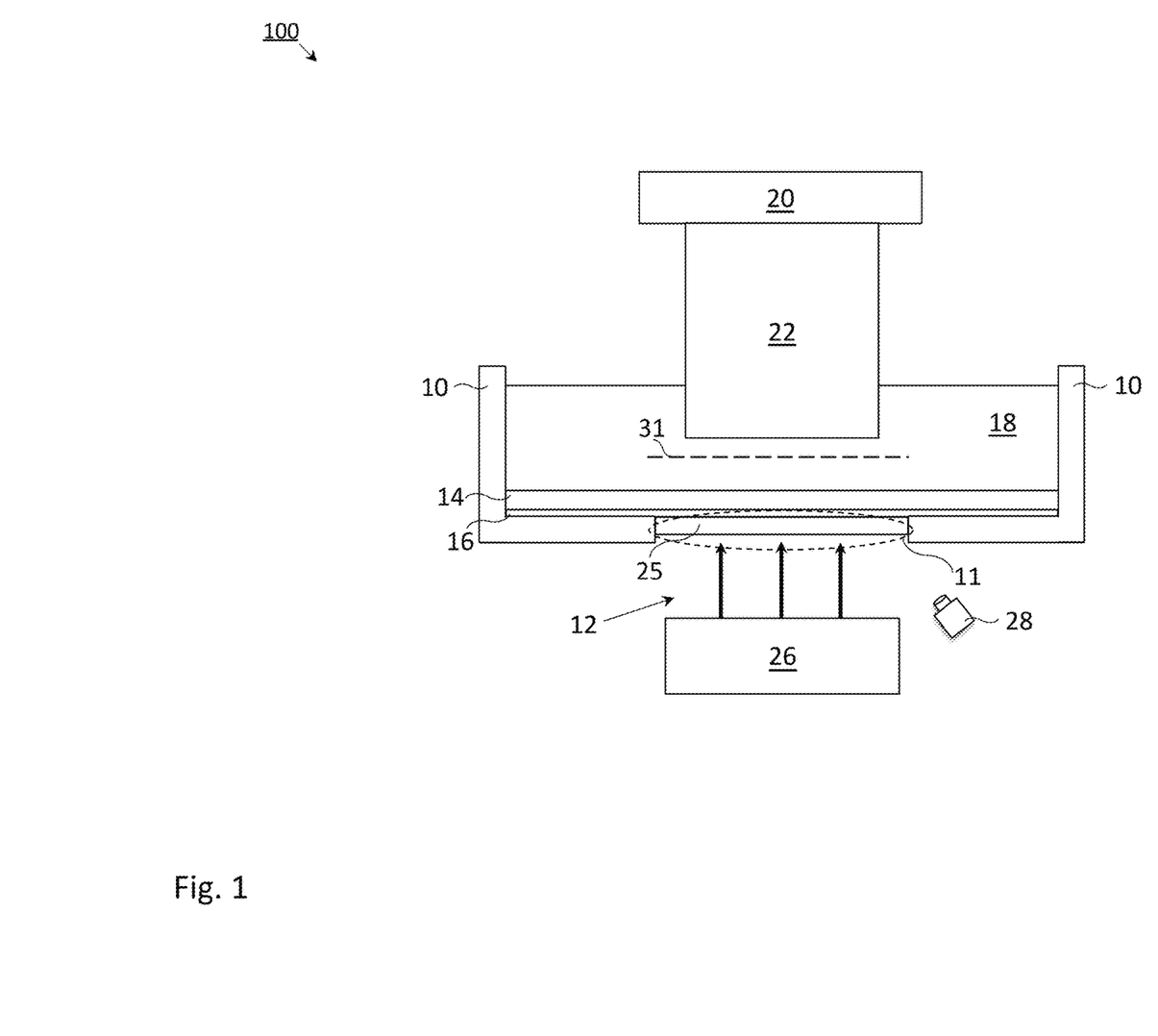
FIG. 1 depicts a schematic cross-section of a 3D printing system, in which a radiation-transparent flexible membrane is used to seal an opening of a tank containing photo-curing liquid resin, in which tank, during printing operations, the photo-curing liquid resin is displaced relative to the build area along an axis orthogonal to that along which the object is extracted from the liquid resin in the tank, in accordance with one embodiment of the invention.

FIG. 1 depicts a cross-section of 3D printing system 100, in which electromagnetic radiation (e.g., ultra-violet light) is used to cure photo-curing liquid polymer 18 in order to fabricate object 22 (e.g., a 3D object). Object 22 may be fabricated layer by layer; that is, a new layer of object 22 may be formed by photo-curing a layer of liquid polymer 18 adjacent to the bottom surface of object 22, the object may be raised by extractor plate 20, allowing a new layer of photo-curing liquid polymer 18 to be drawn under the newly formed layer; and the process repeated to form additional layers.

The 3D printing system 100 includes tank 10 for containing the photo-curing liquid polymer 18. The bottom of tank 10 includes a bottom opening 11 to allow electromagnetic radiation 12 from light source 26 to enter into tank 10. An optional radiation-transparent backing member 16 (e.g., borosilicate glass or a toughened glass such as an alkali-aluminosilicate glass of approximately 100 μm thickness) may be used to seal the tank opening 11 (i.e., to prevent the photo-curing liquid polymer 18 from leaking out of tank 10), while at the same time, allowing electromagnetic radiation to enter into tank 10 in order to cure the liquid polymer. A mask 25 (e.g., one in which charged colorant particles are dispersed in an optically transparent fluid within a plurality of cells) may be disposed between light source 26 and the photo-curing liquid polymer 18 to allow the selective curing of the liquid polymer (which allows the formation of 3D object with intricate shapes/patterns). In various embodiments, so-called electronic ink panels may be used. As used herein, the term "electronic ink panel" is a display panel that forms visible images using one or more of electrophoresis, electro-convection, electro-osmosis, electrochemical interactions, and/or other electrokinetic phenomena. In one embodiment, mask 25 is a DBT133BIU40E0 panel produced by Duobond Display Technology Co. Ltd. of Shenzhen, China.

Figure 7:
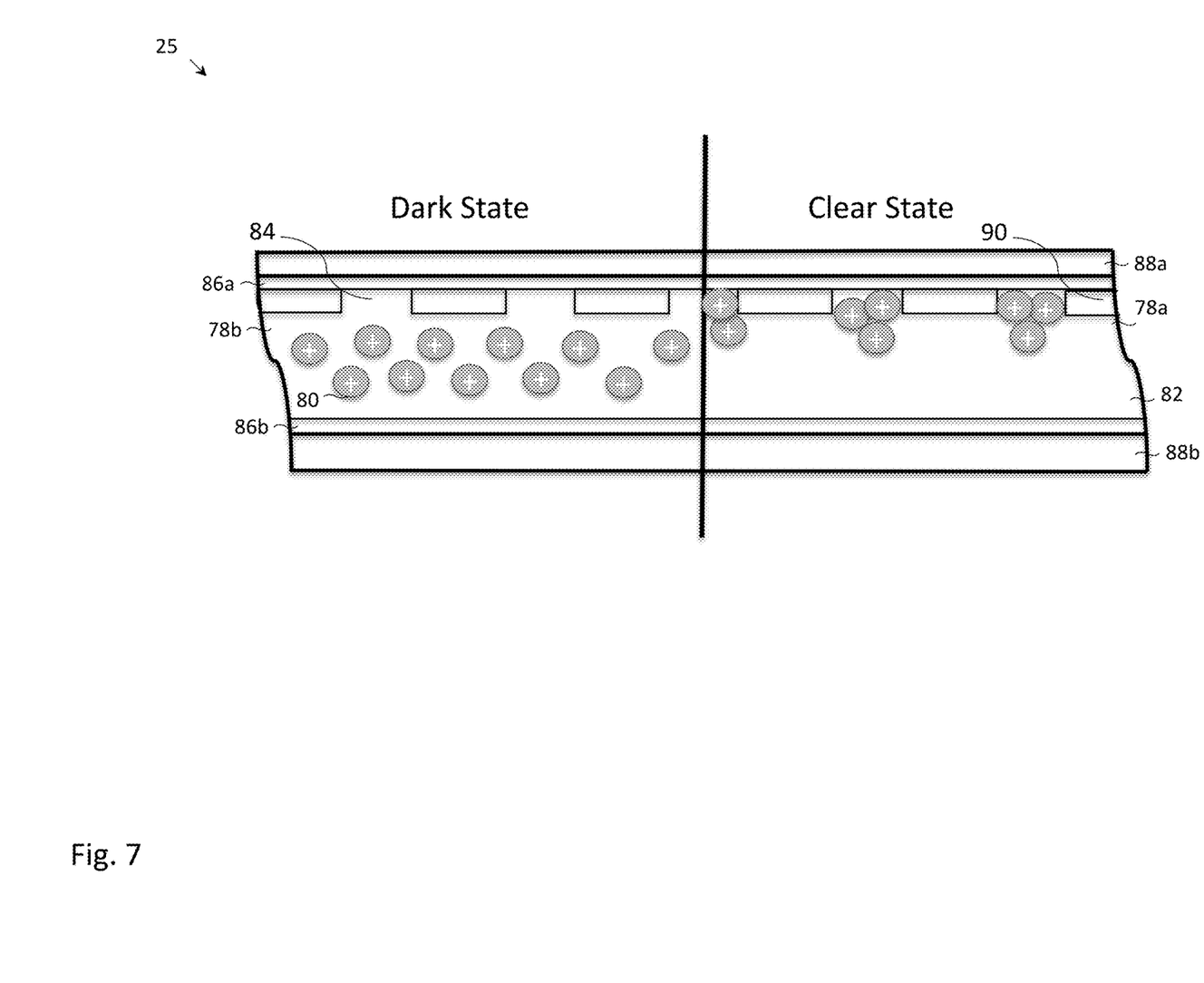
FIG. 7 illustrates examples of dark and clear states of cells of a mask that may be used in accordance with various embodiments of the invention.

For example, mask 25 may be composed of a number of bi-state cells 78a, 78b, each of which have a dark or opaque state and a clear or transparent state as provided by the presence or absence of charged colorant particles 80 in an optically transparent fluid 82. As shown in FIG. 7, the clear state of a cell is achieved when the colorant particles 80 are compacted, e.g., within recesses 84 provided in a cell, and the dark state is achieved when the colorant particles are dispersed throughout a cell. The colorant particles 80 compact or disperse in response to bias voltages applied to electrodes 86a, 86b, disposed on transparent substrates (e.g., polyethylene terephthalate (PET), glass, or other suitable material) 88a, 88b, on opposite sides of the cell. The electrodes may be made of a transparent conducting oxide such as ITO (indium tin oxide), or a transparent conducting polymer such as PEDOT (poly 3,4-ethylenedioxythiophene), or other suitable material. The recesses 84 are defined by dielectric structures 90 and may be formed as recesses within a sheet of transparent dielectric material. Through the control of a plurality of cells (pixels) of the mask, desired patterns can be achieved. That is, the charged colorant particles 80 may be forced to collect within the recesses 84 of designated (addressed) cells according to bias voltages applied to electrode 86a, 86b, where the bias voltages are applied according to the desired patterns to be printed.

Light source 26 provides a collimated luminous flow of radiation, which in one embodiment is within a wavelength region of 350-700 nm, for example, 365-430 nm, and more particularly is at 410 nm or 415 nm. In one embodiment, the collimated luminous flow of radiation is produced by an array of individual light emitters, in particular an array of light emitting diode (LED) sources configured to emit radiation at a wavelength between 365-430 nm, and in particular at 410 nm or 415 nm, as described in commonly owned U.S. patent application Ser. No. 15/864,510, filed Jan. 8, 2018, incorporated herein by reference. As indicated therein, the collimated light source may include an array of baffles and an array of lenses, said baffles arranged so as to limit a beam width of each individual LED source in the array of LED sources to approximately a diameter of a lens of the array of lenses, and the array of lenses is located one focal length from said array of LED sources. In other embodiments, the light source 26 may provide the collimated luminous flow of radiation using a light source configured to emit radiation at a wavelength between 365-430 nm, and more particularly at 410 nm or 415 nm, and telecentric lens assembly. As is known in the art, a telecentric lens is a compound lens that produces collimated light rays from a point source. In this case, an image-space telecentric lens is used. Alternatively, a bi-telecentric lens may be used.

Figure 2:
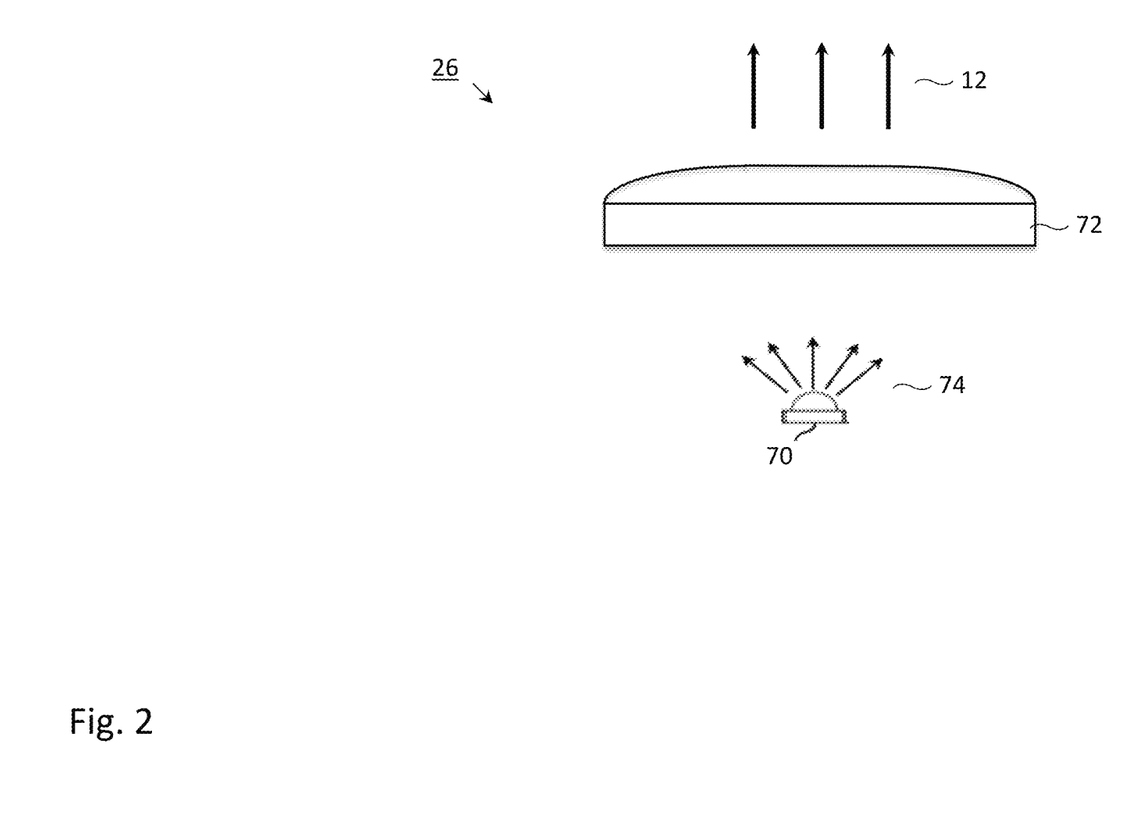
FIG. 2 depicts an example of a light source for the 3D printing system of FIG. 1 employing a telecentric lens, in accordance with one embodiment of the invention.

FIG. 2 shows an example of a portion of a light source 26 in which a telecentric lens 72 is used. One or more LEDs 70, which emit radiation 74 at a wavelength between 365-430 nm, and more particularly at 410 nm or 415 nm, are disposed so as to emit the radiation towards telecentric lens arrangement 72. Telecentric lens arrangement 72 collects radiation incident upon its entrance pupil and emits collimated radiation 12 at its exit pupil. This collimated radiation is then incident upon the mask (not shown in this view). Because the light rays approaching the mask have the same angle of incidence and angular subtense everywhere in the image plane, the surface of the mask is evenly illuminated.

Returning to FIG. 1, mask 25 is an LCD or electronic ink panel that includes a plurality of addressable pixels. The pixels can be made individually transparent or opaque to the incident radiation 12. The effect of the incident radiation passing through the transparent ones of the pixels forms an image at the build area 31 within the photo-curing liquid polymer 18. The individual pixels are made transparent or opaque by applying or not applying a bias voltage thereto, under the control of a processor or other controller that is provided a bit mapped (or other) version of the image of the layer being fabricated.

Control of either or both of two parameters will affect the contrast ratio of the light source and mask combination. One is the degree or level of collimation of the radiation produced by light source 26. The other is the wavelength of light produced by light source 26. Consider that in mask 25, individual, roughly spherical, colorant particles of approximately 150-250 nm diameter are present. When a cell of the mask is in the dark state, these particles are dispersed approximately uniformly within the transport fluid in the cell. Ideally, the particles are arranged so that there are no gaps between them that will pass radiation from light source 26, however, in practice this cannot be assured as the arrangement of the particles is not controlled when the cell is in a dark state. Nevertheless, the colorant particles will usually be sufficiently dispersed and overlapped with one another so that rays of sufficiently collimated light will be mostly blocked. The greater the degree of collimation, the more rays are blocked. For this reason, the use of a telecentric lens arrangement is preferred as it tends to provide the best level of collimation.

Similarly, longer wavelengths of the of the light produced by light source 26 tend to provide better contrast because these longer wavelengths are more readily blocked by the nanoparticles within the cells of the mask 25. Using telecentric optics and UV radiation at 415 nm, contrast ratios of up to 1:500 are achievable. Even with other optical arrangements and UV radiation at 415 nm, contrast ratios of up to 1:200 have been achieved.

One challenge faced by 3D printing systems of the present kind is that in addition to adhering to the object 22, newly formed layers tend to adhere to the bottom of the tank. Consequently, when the extraction plate to which the object is attached is raised, the newly formed layer could tear and/or become dissociated from the object. To address this issue, a flexible membrane 14 is disposed adjacent to backing member 16 (if present) or to the bottom of the tank (if no backing member is used). Flexible membrane 14 may be formed of silicone or another material and, optionally, coated with a non-stick material such as polytetrafluoroethylene (PTFE) to reduce the likelihood for the newly formed layer to adhere to the bottom of tank 10. The flexible membrane 14 is transparent (or nearly so) to the wavelength of radiation emitted by the light source 26 so as to allow that radiation to enter into tank 10 in order to cure the liquid polymer 18.

As an alternative to flexible membrane 14, an optically transparent polymerization inhibitor with a permeable or semipermeable build surface may be used. Such an arrangement is described, for example, in U.S. Pat. No. 9,205,601, incorporated herein by reference. Briefly, the polymerization inhibitor and semipermeable build surface provide a zone between the bottom of the tank and the build area within which the resin is prevented from undergoing polymerization when exposed to the UV radiation.

Optionally present in 3D printing system 100 are one or more thermal imaging devices 28. These imaging devices are oriented to observe the build area 31 through the LCD panel 25 in the bottom opening 11 of tank 10. The imaging devices 28 may be used to observe fabrication of object 22, that is the polymerization of the liquid polymer that make up the layers of the object. The imaging devices may provide images in the infra-red and/or visible portion of the spectrum and may be infra-red imaging devices, CCDs, and/or other imaging devices. By evaluating the images of the layers as they are being formed, a controller (not shown) may vary the intensity of the radiation produced by the light source (e.g., using one or more filters) and/or detect possible points of failure of the object (e.g., due to insufficient polymerization, overheating, etc.).

The controller may, for example, be a computer-based controller configured (under appropriate software instructions) to receive infra-red images from imaging devices 28 and to evaluate those images (e.g., based on color or other characteristics) to determine properties of each layer as it is created. For example, pixels of the infra-red images provided by imaging devices 28 may be assessed against cross sectional layer models of the object undergoing fabrication to determine whether the areas of the liquid polymer corresponding to said layer are being properly formed. Similarly, adjacent areas of the liquid polymer that do not form part of the cross-sectional layer of the object may be evaluated to ensure they are not being polymerized. In various embodiments, UV filters or films may be positioned between mask 25 and imaging devices 28 to ensure that the UV radiation does not interfere with the images. These elements are not shown in the illustrations so as not to unnecessarily obscure the drawings.

Figure 3A:
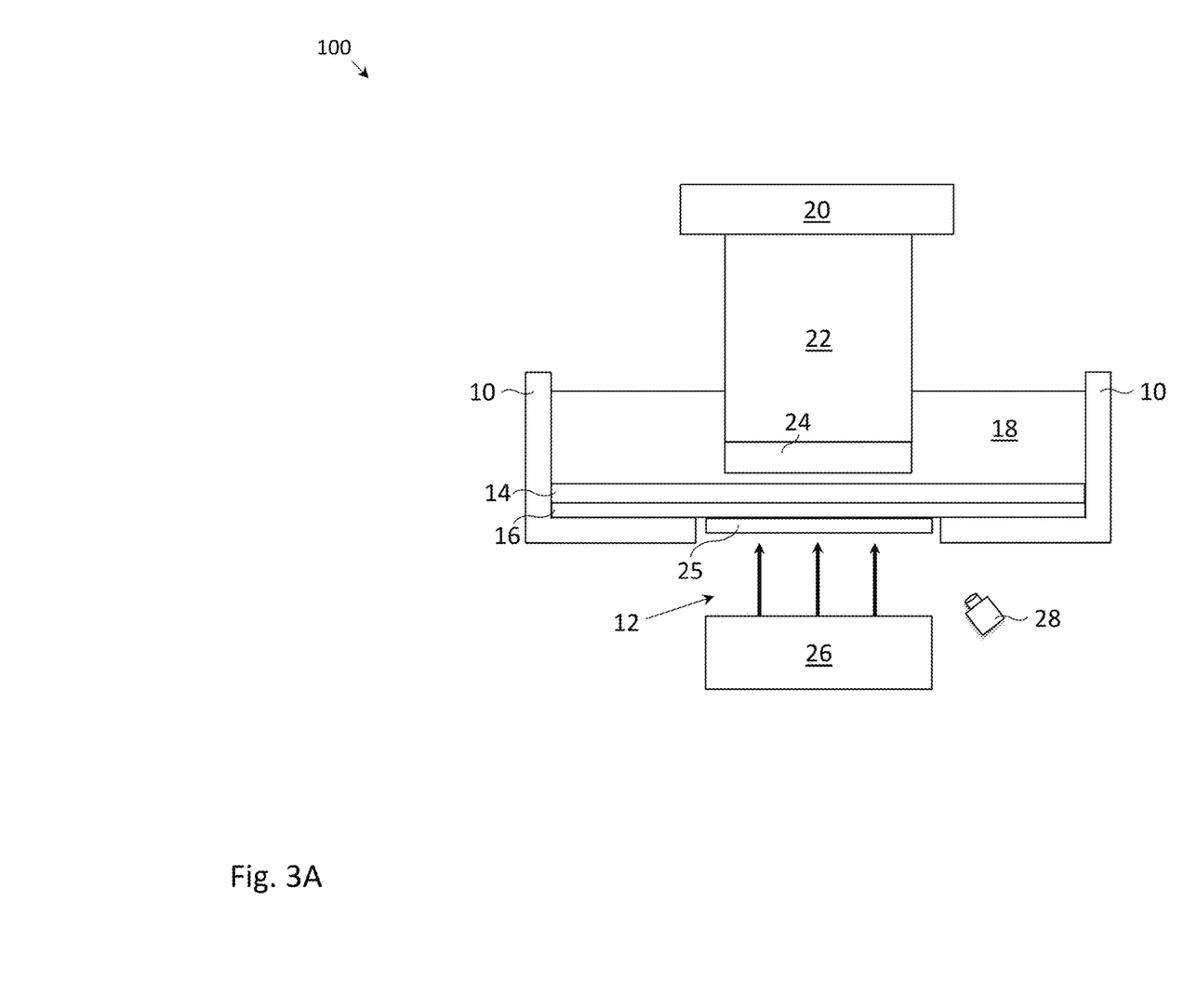
FIGS. 3A-3C depict various steps in the manufacture of an object using the 3D printing system of FIG. 1.
Figure 3B:
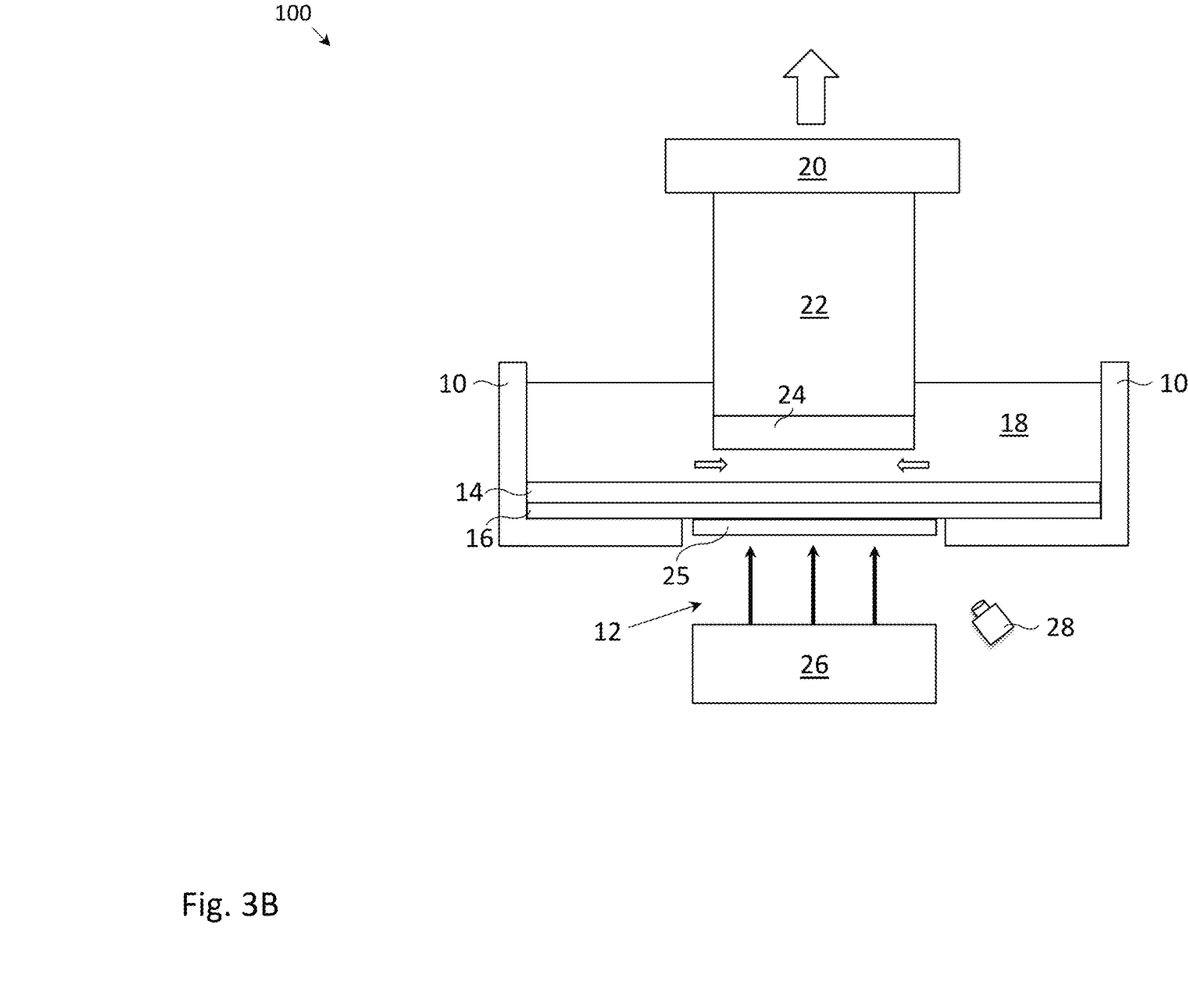
Figure 3C:
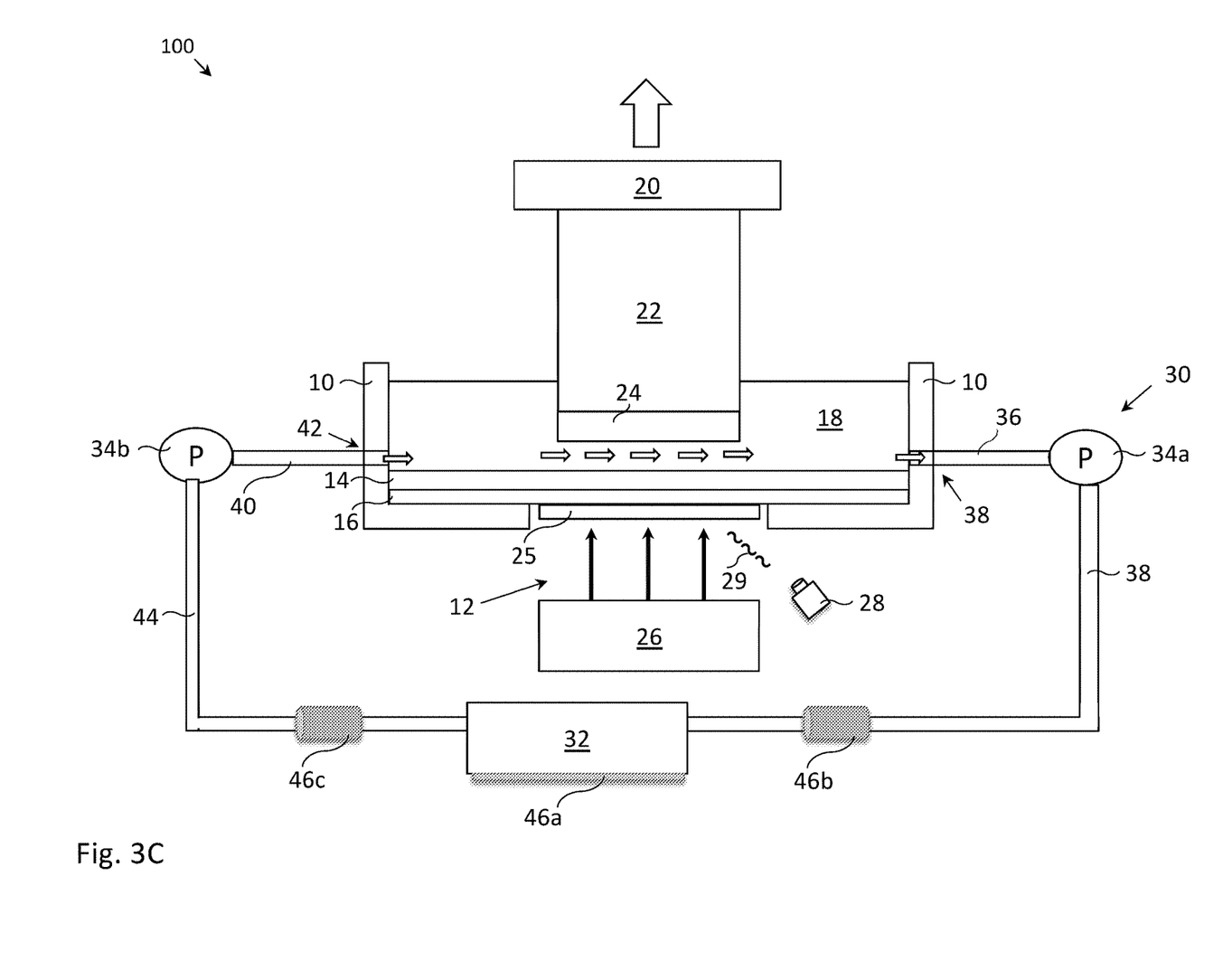

FIGS. 3A-3C illustrate steps that may be sequentially performed in the fabrication of one layer of object 22 using 3D printing system 100. As shown in FIG. 3A, electromagnetic radiation 12 is emitted from light source 26 through tank opening 11 and mask 25 into tank 10. The electromagnetic radiation causes at least partial curing of liquid polymer 18 to form new layer 24 that adheres to object 22. Cured layer 24 does not adhere to the bottom surface of tank 10, due to the presence of membrane 14. After cured layer 24 has been formed, the emission of electromagnetic radiation 12 may temporarily be suspended (or not, in the case of continuous printing). An inspection step may be performed to assess the quality of the newly formed layer 24. More specifically, information regarding the newly formed layer 24 may be obtained by assessing thermal images provided by imaging device 28.

Once the newly formed layer 24 has been assessed, object 22 may be raised within tank 10, as shown in FIG. 3B, in preparation for a subsequent layer of photo-cured liquid polymer to be formed. While raising object 22 within tank 10, photo-curing liquid polymer 18 may be drawn into the void generated by the raising of object 22, and such photo-curing liquid polymer 18 will allow for the formation of the next layer of object 22.

Alternatively, as shown in FIG. 3C, a resin circulatory system 30 may be used to circulate the liquid polymer 18 through the tank 10 and a reservoir 32. The resin circulatory system 30 includes one or more pumps 34a, 34b, which in one embodiment are peristaltic pumps. Pump 34a is fluidly coupled, e.g., by way of piping 36, to an exit port 38 in a sidewall of tank 10. Pump 34a draws out a volume of liquid polymer 18 from tank 10 and discharges it into reservoir 32 via piping 39. Pump 34b is fluidly coupled, e.g., by way of piping 40, to an entrance port 42 in another sidewall of tank 10. Pump 34b draws out a volume of liquid polymer 18 from reservoir 32 via piping 44 and discharges it into tank 10 via piping 40 and entrance port 42. The volume of liquid polymer drawn out of the tank may be equal to, greater than, or less than the volume of liquid polymer replaced therein.

Further, the reservoir 32 and/or the piping arrangements 39, 44, may have associated heat exchangers 46a, 46b, 46c, to chill the liquid polymer 18.

The entrance and exit ports 42, 38, are preferably formed in opposite sidewalls of tank 10 between which lies the build area for object 22. These two sidewalls define a lateral dimension of tank 10 that is either the same size as or shorter than an orthogonal lateral dimension formed by another pair of opposing sidewalls. This way, the liquid polymer is displaced, by the actions of pumps 34a, 34b, across a shortest lateral dimension of tank 10 and in a direction orthogonal to that along which extraction plate 20 is displaced (to raise object 22) during printing.

The resin circulatory system 30 is configured to cool the photo-curing liquid resin 18 as it passes from the exit port of tank 10 back into the tank through the entrance port. For example, the system may include one or more heat exchangers 46a, 46b, 46c, for such a purpose. In one instance, lengths of piping may be passed in a serpentine path along a cooled plate that acts as a heat sink. Along the exterior of the reservoir 32 refrigeration coils may be used. Alternatively, or in addition, thermoelectric cooling means, such as a Peltier cooler may be employed as part of the resin cooling arrangement to assist in cooling the resin within the resin circulatory system 30.

Although not shown in the drawings, one or more particle filters may be included within the resin circulatory arrangement in order to remove undesirable by-products of the polymerization process or contaminants that are introduced into the resin from the printer environment. The filters may be placed prior to or after reservoir 32, as viewed from the standpoint of resin flow. Reservoir 32 may also include an evacuation port to allow for draining of the resin from the tank. Similarly, the reservoir 32 may have a port that allows for introduction of fresh resin into the system.

Figure 4:
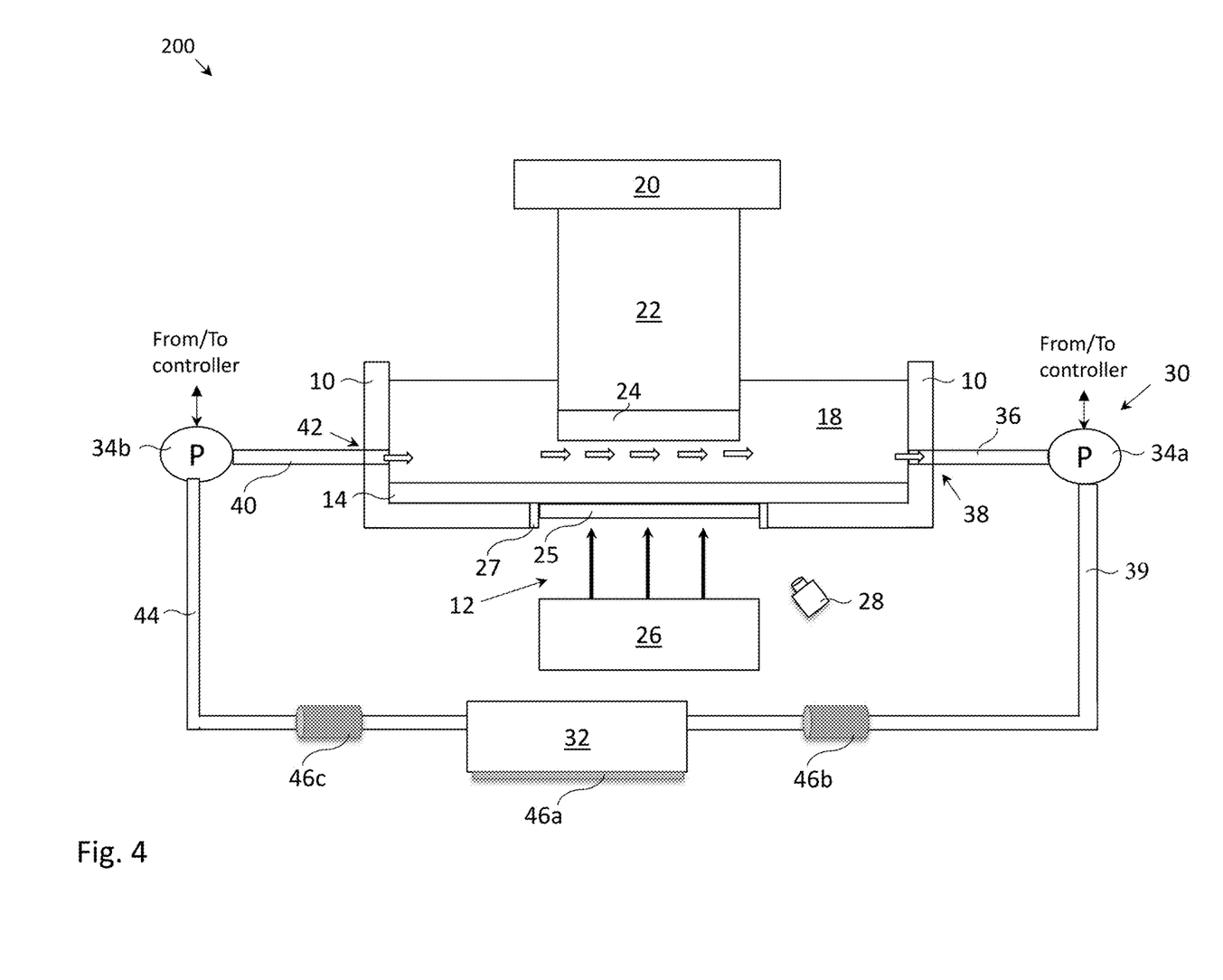
FIG. 4 depicts a 3D printing system, illustrating aspects of a resin circulatory system in accordance with one embodiment of the invention.

As noted above, the presence of backing member 16 to seal tank opening 11 is optional. As shown in FIG. 4, in a system 200 the mask 25 may be placed within tank opening 11 and surrounded by a gasket 27 in order to seal the tank opening. In such embodiments, flexible membrane 14 may be disposed directly over the bottom of tank 10 and the top surface of mask 25. Operation of the system as so configured is in accordance with the above description and may include the resin circulatory system.

Figure 5:
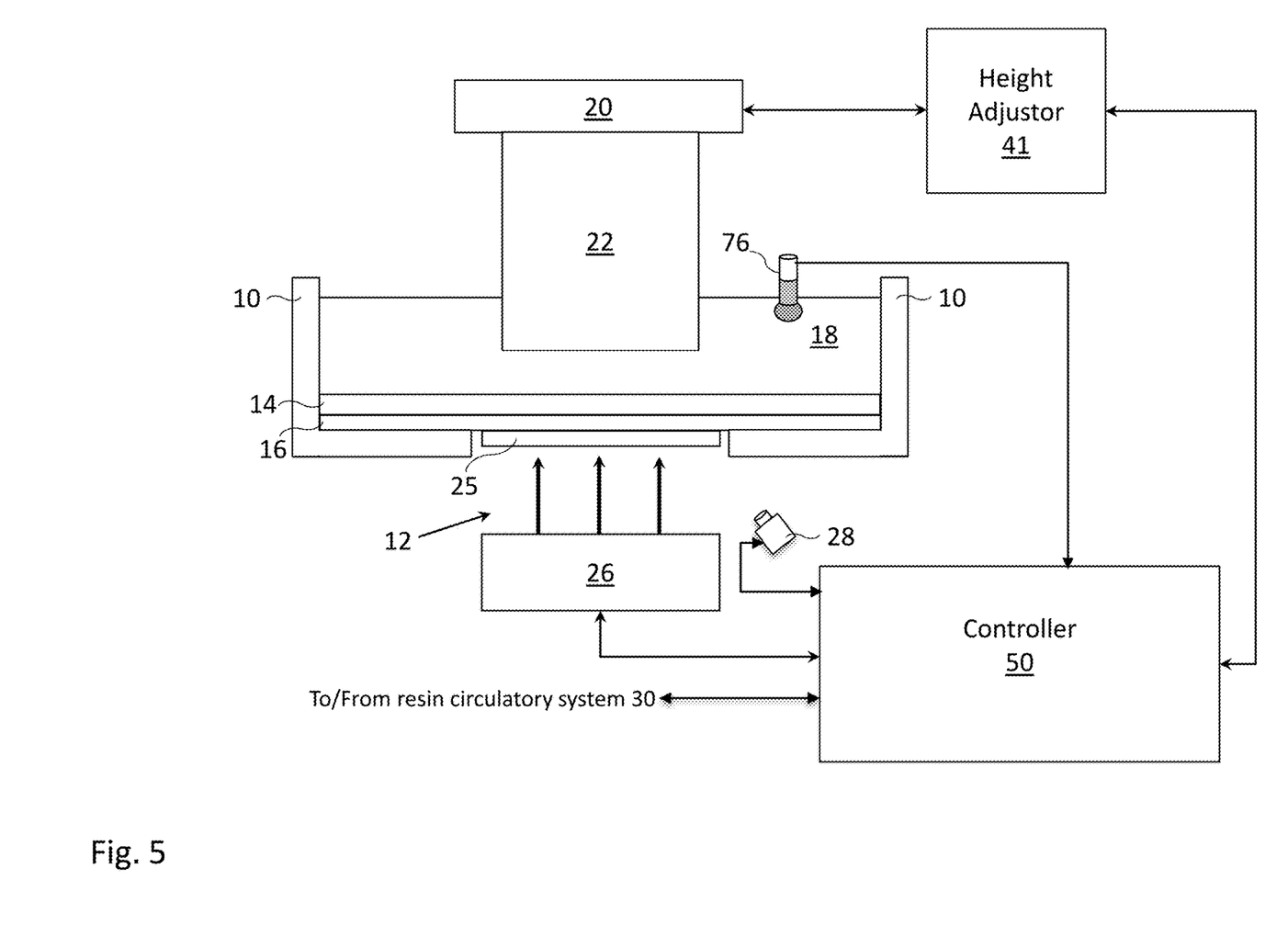
FIG. 5 depicts aspects of a control system for a 3D printing system configured in accordance with one embodiment of the invention.

Referring now to FIG. 5, the vertical displacement of extraction plate 20 is controlled by height adjustment means 41, which, in turn, is operated by controller 50. Controller 50 also may operate the pumps and cooling elements of the resin circulatory system 30 (not shown in this view for clarity). The vertical position of extraction plate 20 may be adjusted along a single rail/track, e.g., positioned at the rear of the tank, and a single actuator used in respect of same. In one embodiment, the actuator may be a stepper motor configured to advance the extraction plate in one direction or the other along a vertical axis. An alternative is to use piezo translators that include a piezo ceramic that expands in a defined direction upon application of an electric current (e.g., under the control of controller 50). The ceramic is orientated so that when it expands (at the application of a current under the control of controller 50), extraction plate 20 is moved along the vertical axis in the direction of the expansion of the crystal. Generally, a number of piezo translators may be used to move the extraction plate and the various piezo translators may be energized at the same time (or nearly so) so that their actions are coordinated with one another. Thus, the piezo translators may be arranged so that they impart vertical motion to the extraction plate in the same direction and the translation distance may be proportional to the magnitude of the current applied to the piezo translators. In some embodiments, the translation distance of the extraction plate for each activation of the piezo translators is on the order of a few microns to a few millimeters. Piezo translator(s) as may be employed in embodiments of the present invention may be any of: longitudinal piezo actuators, in which an electric field in the ceramic is applied parallel to the direction of its polarization; piezoelectric shear actuators, in which the electric field in the ceramic is applied orthogonally to the direction of its polarization; or tube actuators, which are radially polarized and have electrodes are applied to an outer surfaces of the ceramic so that the field parallel to its polarization also runs in a radial direction.

Figure 6:
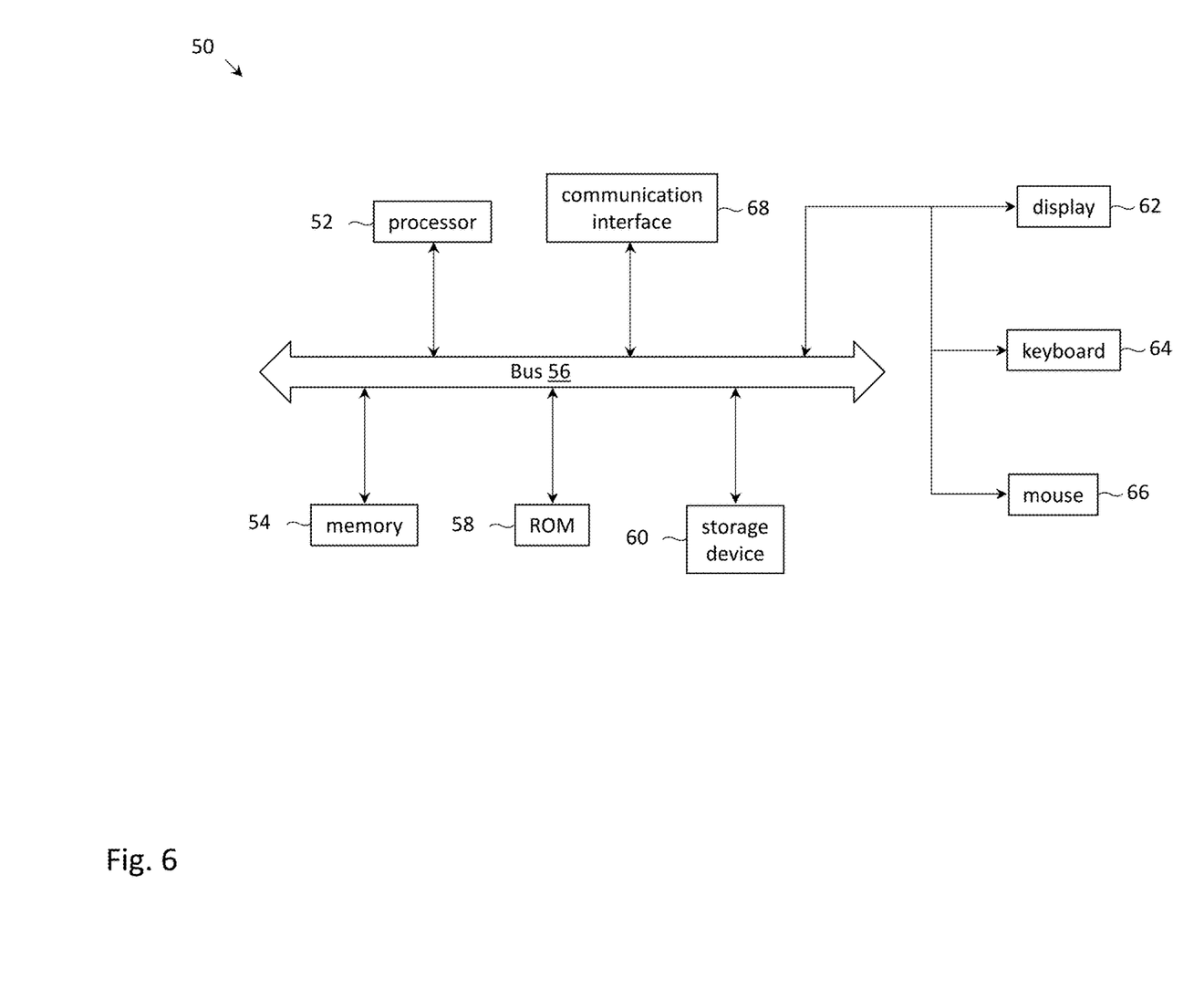
FIG. 6 depicts components of a processor-based controller in which computer readable instructions instantiating the methods of the present invention may be stored and executed.

As shown in FIG. 6, in one embodiment controller 50 includes a processor 52 that executes computer-readable instructions (i.e., computer programs or routines) defining methods as described herein, which methods are instantiated and run on non-transitory computer-readable media such as memory 54. Such processes may be rendered in any computer language and executed on any suitable programmable logic hardware. Processor-based controllers 50 upon or with which the methods of the present invention may be practiced will typically include a bus or other communication mechanism 56 for communicating information; a main memory 54, such as a RAM or other dynamic storage device, coupled to the bus for storing information and instructions to be executed by the processor and for storing temporary variables or other intermediate information during execution of instructions to be executed by the processor; and a ROM 58 or other static storage device coupled to the bus for storing static information and instructions for the processor. A storage device 60, such as a hard disk or solid-state drive, may also be included and coupled to the bus for storing information and instructions. The subject controller may, in some instances, include a display 62 coupled to the bus for displaying information to a user. In such instances, an input device 64, including alphanumeric and/or other keys, may also be coupled to the bus for communicating information and command selections to the processor. Other types of user input devices, such as cursor control devices 66 may also be included and coupled to the bus for communicating direction information and command selections to the processor and for controlling cursor movement on the display.

The controller 50 may also include a communication interface 68 coupled to the processor via the bus, which provides for two-way, wired and/or wireless data communication to/from the controller, for example, via a local area network (LAN). The communication interface sends and receives electrical, electromagnetic, or optical signals which carry digital data streams representing various types of information. For example, the controller 50 may be networked with a remote unit (not shown) to provide data communication to a host computer or other equipment operated by a user. The controller can thus exchange messages and data with the remote unit, including diagnostic information to assist in troubleshooting errors, if needed.

The processes referred to herein may be implemented by processor 52 executing appropriate sequences of computer-readable instructions contained in main memory 54. Such instructions may be read into main memory 54 from another computer-readable medium, such as storage device 60, and execution of the sequences of instructions contained in the main memory 54 causes the processor 52 to perform the associated actions. In alternative embodiments, hard-wired circuitry or firmware-controlled processing units may be used in place of or in combination with processor 52 and its associated computer software instructions to implement the invention.

In addition to controlling the displacements of extraction plate 20 during printing operations, controller 50 may also control light source 26 (e.g., controlling the timing and/or intensity of light), and mask 25 (e.g., controlling which regions of the mask pass light and which regions block light). Further, and with reference to FIG. 3C, controller 50 may operate one or more pumps 34a, 34b, to recirculate resin 18 through tank 10 during printing. In various embodiments of the invention, a volume of the photo-curing liquid resin is cycled through a resin cooling arrangement 30 by being extracted from the tank, cooled, and then reintroduced into the tank 10 as printing of the object 22 is taking place. Recycling of the photo-curing liquid resin in this fashion further helps to manage the temperature of the liquid resin in the tank and the temperature of the mask 25. Mask temperature 25 may also be managed by blowing chilled air 29 on the underside of the mask.

The resin temperature may be managed, for example, using a temperature sensor 76 disposed in tank 10 (see FIG. 5). Temperature readings from such a sensor (and/or from imaging device 28) may be sampled by controller 50 and, based thereon, the rate at which the liquid resin is circulated through the tank may be increased, decreased, or maintained. For example, if the temperature of the resin in the tank (e.g., near the build area) is deemed to be too warm, the rate of resin circulation may be increased (e.g., by increasing the pumping rate) so as to ensure that the warm resin is removed from the build area more quickly. If the temperature of the resin in the tank (e.g., near the build area) is deemed to be too cold, the rate of resin circulation may be slowed (e.g., by slowing the pumping rate) so as to ensure that the warm resin is maintained in the build area. If the temperature of the resin in the tank (e.g., near the build area) is deemed to be acceptable, the rate of resin circulation may be maintained at a then-present rate. Together with such practices, the heat exchangers may be operated so as to affect the chilling of the resin within the resin circulatory system.

Thus, embodiments of the invention provide for printing of objects through photo-curing of a liquid resin by controlling a radiation source and a mask so as to form successive layers of photo-cured liquid resin into desired shapes within a tank containing the liquid resin. The tank includes an opening sealed by a radiation-transparent flexible membrane through which the radiation for selectively curing the liquid resin is introduced. During printing, a height adjustor is controlled so as to displace the object being formed along a first axis with respect to a first surface of the radiation-transparent flexible membrane facing into the tank. During printing of the object, a pumping arrangement may be controlled to circulate a volume of the photo-curing liquid resin through the tank, that is the build area, while forming layers of photo-cured liquid resin of the object such that the photo-curing liquid resin is introduced into/extracted from the tank along an axis orthogonal to the first axis. The volume of the photo-curing liquid resin may be cooled during such circulation, after extraction from the tank and before reintroduced thereto.

During printing, the layers of photo-cured liquid resin may be monitored using thermal imaging devices. Such monitoring allows for detection of possible points of failure in the object being fabricated and also the adjustment of the build process. For example, the intensity of radiation from the light source may be altered (e.g., through the use of exposure times, exposure intensity, exposure wavelengths, etc.) so as to affect the build process. In addition, the thermal imaging devices provide feedback concerning temperatures being experienced in the build area, thereby allowing control over the pumping arrangement to control the rate at which resin is circulated through the build area.

Thus, photolithographic systems as employ a photo-sensitive resin which is cured through selective exposure to radiation and, more specifically, such systems and methods in which such a photo-sensitive resin is cured through exposure to radiation when fabricating a three-dimensional object have been described.

What is claimed is:

1. A method, comprising:
   controlling a light source and a mask so as to form a first layer of photo-cured liquid resin of an object by passing light through a telecentric lens system towards and through the mask while various ones of pixels of the mask are biased to be transparent or opaque, the object located within a tank containing a photo-curing liquid resin, the tank including a tank opening, and the tank opening sealed by a radiation-transparent flexible member;
   controlling a height adjustor so as to displace an extractor plate, and through the displacement of the extractor plate to further displace the object coupled to the extractor plate, along a first axis, with respect to a first surface of the radiation-transparent flexible membrane facing into the tank;
   controlling the light source and the mask so as to form a second layer of photo-cured liquid resin of the object by passing light through the telecentric lens system towards and through the mask while the various ones of pixels of the mask are biased to be transparent or opaque; and
   controlling a pumping arrangement to circulate a volume of the photo-curing liquid resin through the tank while forming said first and second layers of photo-cured liquid resin of the object such that the photo-curing liquid resin is introduced into the tank through a first sidewall opening and is extracted from the tank through a second sidewall opening distinct from the first sidewall opening,
   wherein the first sidewall opening and the second sidewall opening are located on opposite lateral sides of the tank defining a shortest lateral dimension of the tank, and
   wherein the pumping arrangement is configured to circulate the volume of the photo-curing liquid resin across the shortest lateral dimension of the tank and in a direction orthogonal to the first axis.

2. The method of claim 1, further comprising cooling, with a cooling arrangement, the volume of the photo-curing liquid resin after it has been extracted from the tank through the second sidewall opening and before it is introduced into the tank through the first sidewall opening.

3. The method of claim 2, wherein the cooling arrangement comprises a length of tubing for transporting the volume of the photo-curing liquid resin, the length of tubing being in contact with a heat sink.

4. The method of claim 3, wherein the pumping arrangement includes a peristaltic pump in contact with the length of tubing and a reservoir for storing the photo-curing liquid resin.

5. The method of claim 2, wherein the cooling arrangement comprises a Peltier element.

6. The method of claim 1, further comprising:
   receiving a temperature measurement of the photo-curing liquid resin in a build area of the tank; and
   controlling the pumping arrangement to circulate the volume of the photo-curing liquid resin through the tank at a rate that is responsive to the measured temperature.

7. The method of claim 6, wherein the temperature measurement is received from a temperature sensor disposed in the tank.

8. The method of claim 6, wherein the temperature measurement is received from a thermal imaging device oriented to observe the build area through the mask.

9. The method of claim 8, wherein the mask is a liquid crystal display (LCD) panel disposed adjacent to the tank opening.

10. The method of claim 1, further comprising:
    monitoring using a thermal imaging device the first and second layers of photo-cured liquid resin; and
    altering an intensity of radiation from the light source in response to the monitoring.

11. The method of claim 10, wherein the intensity of radiation is altered using one or more light filters.

12. The method of claim 10, wherein altering the intensity of radiation comprises varying an exposure time.

13. The method of claim 10, wherein altering the intensity of radiation comprises varying an exposure intensity.

14. The method of claim 10, wherein altering the intensity of radiation comprises varying an exposure wavelength.

15. The method of claim 1, further comprising:
    monitoring using a thermal imaging device the first and second layers of photo-cured liquid resin; and
    based on the monitoring, detecting possible points of failure in the object being formed.

16. The method of claim 1, further comprising cooling an underside of the mask using a cooling arrangement.

17. The method of claim 16, wherein cooling the underside of the mask comprises blowing chilled air on the underside of the mask.

18. The method of claim 1, wherein the light source is configured to emit collimated ultraviolet light towards the tank opening and through the mask.

19. The method of claim 1, wherein the first sidewall opening and the second sidewall opening face one another.

20. The method of claim 1, wherein the first sidewall opening and the second sidewall opening are disposed at an identical vertical elevation as one another.

* * * * *